United States Patent [19]

Kim

[11] Patent Number: 5,282,031

[45] Date of Patent: Jan. 25, 1994

[54] FIXED BIT RATE COMPRESSION ENCODING METHOD

[75] Inventor: Yong-kyu Kim, Seoul, Rep. of Korea

[73] Assignee: Samsung Electronics Co., Ltd., Rep. of Korea

[21] Appl. No.: 912,472

[22] Filed: Jul. 13, 1992

[30] Foreign Application Priority Data

Feb. 28, 1992 [KR] Rep. of Korea ............ 92-3243

[51] Int. Cl.$^5$ ............................................. H04N 7/133
[52] U.S. Cl. .............................................. 358/133
[58] Field of Search .......................... 358/133, 13; H04N 7/133

[56] References Cited

U.S. PATENT DOCUMENTS 4,963,030  10/1990  Makur .......................... 358/133
5,144,423   9/1992  Knauer ......................... 358/133

Primary Examiner—Howard W. Britton
Attorney, Agent, or Firm—Sughrue, Mion, Zinn, Macpeak & Seas

[57] ABSTRACT

A fixed bit rate compression encoding method for dividing a two-dimensional video signal into DCT blocks and encoding the transform coefficients of each DCT block at a certain compression rate. The DC coefficient of each DCT block is scalar-quantized by 1 bits, each DCT block is classified into m classes according to its edge direction, AC coefficients of the classified DCT blocks are approximated to n representative vectors set for each class and are vector-scalar-quantized by p-bit indices of each representative vector, and the number B of encoding bits per block is generated at a fixed bit rate according to the expression: $B = 1 + \log_2 m + n \times p$.

6 Claims, 3 Drawing Sheets

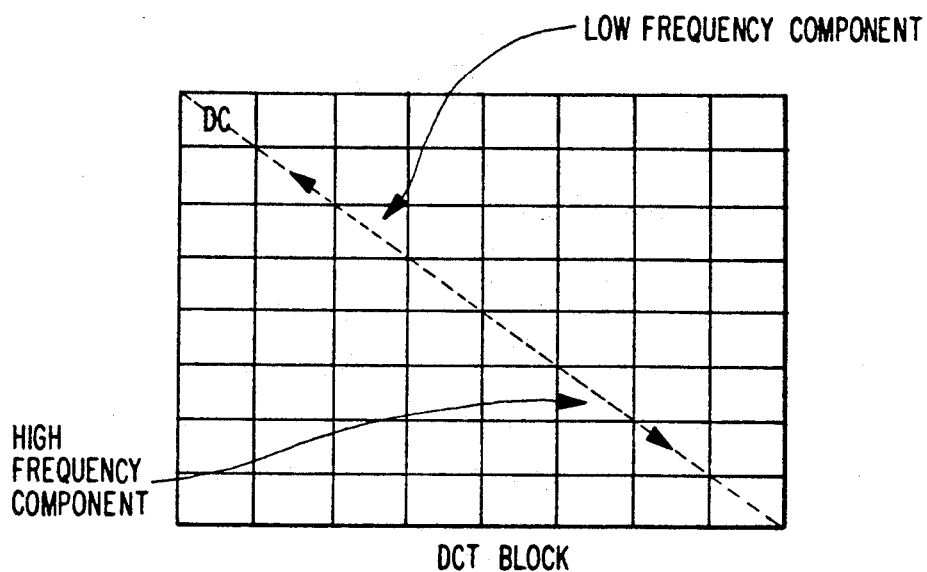

FIXED BIT RATE COMPRESSION ENCODING METHOD

BACKGROUND OF THE INVENTION

The present invention relates to a compression encoding method, and more particularly to a fixed bit rate compression encoding method where the number of encoding bits is fixed per DCT block.

Recently, video data compression technology has been used in processing video signals as digital data in a digital video apparatus such as a digital VCR, an HDTV, a digital video camera or a video telephone.

Since known image compression technology has a variable number of compressed coding bits according to picture complexity, a problem has been raised about how to keep the compression result constant in digital VCRs, HDTVs and other devices which require a constant compression result. Especially for compression in a digital VCR, when video signals corresponding to one picture or one segment thereof are to be encoded and recorded in a track of magnetic tape having limited length, if the number of encoded bits exceeds one track, a conventional digital VCR method records the excess encoded bits in a next track or, if the number of encoded bits exceeds that of the set bits, stops coding and ignores the remaining data.

However, if the excess encoded bits are recorded in a next track, then the operations of a special playback and high speed search are difficult to implement. Further, the recording method wherein the coding stops (and remaining data is ignored) is problematic since this recording method deteriorates the quality of the reproduced picture due to the partial loss of its image information.

SUMMARY OF THE INVENTION

Therefore, it is an object of the present invention to provide a fixed bit rate compression encoding method having a constant bit rate regardless of the picture complexity.

The present invention accomplishes this and other objects. The present invention provides a compression encoding method which divides a two-dimensional video signal into discrete cosine transform (DCT) blocks and encodes the transform coefficients of each DCT block at a certain compression rate. The fixed bit rate compression encoding method of the present invention is performed so that the DC coefficients of respective DCT block are scalar-quantized by l bits, and each DCT block is classified into m classes according to edge direction. AC coefficients of the classified DCT blocks are approximated to n representative vectors set for each class, and are vector-scalar-quantized by p-bit indices of each representative vector, and a number B of encoding bits per block is generated at a fixed bit rate according to the expression $B = l + \log_2 m + n \times p$.

BRIEF DESCRIPTION OF THE DRAWINGS

The above objection and other advantages of the present invention will become more apparent by describing in detail a preferred embodiment of the present invention with reference to the attached drawings in which:

FIG. 2(A) and 2(B) are illustrative drawings for explaining the coefficients of DCT block and HVM.

DETAILED DESCRIPTION OF THE PREFERRED EMBODIMENT

Figure 1:
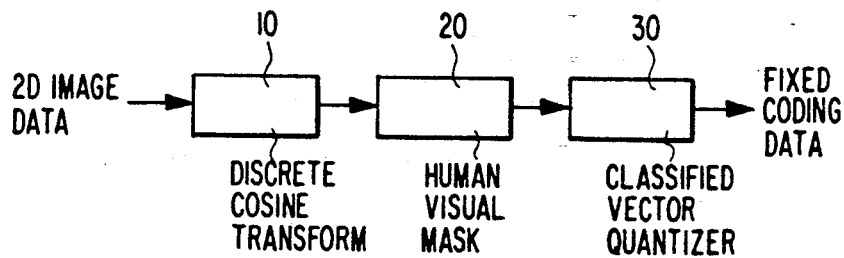
FIG. 1 is a block diagram of a compression encoder of the present invention.

In the fixed bit rate compression encoding method according to the present invention, DC coefficients of DCT blocks are scalar-quantized and AC coefficients are classified-vector-quantized. In the classified-vector-quantization, the size of a first AC coefficient (a) and a second AC coefficient (b) of DCT blocks, which are determined in a zig-zag scanning order, are compared, and the edge direction of each DCT block is detected according to the size and sign of the two coefficients (i.e., (a) and (b)) to classify each block according to the detected result. Code books of a plurality of representative vectors corresponding to each classified DCT block, and corresponding p-bit indices of the representative vectors and the classifying codes in each code book are provided as encoding data corresponding to the AC coefficients. Thus, the encoding data corresponding to the scalar-quantized DC coefficients and the encoding data corresponding to the vector-quantized AC coefficients are generated as the overall encoding data of DCT blocks. This enables compression encoding at a fixed bit rate regardless of picture complexity. The following is the description of a preferred embodiment of the present invention.

In FIG. reference numeral 10 denotes a Discrete Cosine Transform (DCT) block, 20 denotes a human visual mask (HVM), and 30 denotes a vector quantization block.

The well-known DCT block 10 divides a two-dimensional video signal into blocks having an N×N size, e.g., 8×8, and DC-transforms each block to generate DCT coefficients. Specifically, the DCT block 10 processes a digitized 2D image data signal to generate DCT coefficients. The DCT coefficients are obtained by the following formula:

$$f(u,v) = \frac{4C(u)C(v)}{N^2} \sum_{m=0}^{N-1} \sum_{n=0}^{N-1} f(m,n) \cos\left[\frac{(2m+1)u\pi}{2N}\right] \cos\left[\frac{(2N+1)V\pi}{2N}\right]$$

where u, v = 0,1,2, ... N−1; m,n = 0,1,2, ... N1 (Here, f(m,n) is the picture element); and C(W) equals $1/\sqrt{2}$ when W=0, and equals 1 when W=1,2, ... N−1. The above formula is well-known.

The HVM 20 is well known in the art and serves to eliminate or process DCT coefficients of a spatial frequency to which human eyes are not sensitive. That is, the operation of HVM block 20 is modeled after the human characteristics relative to peripheral vision. Specifically, a human's peripheral vision is sensitive to low frequencies, but is insensitive to high frequencies. In general, after modeling the sensitivity transform characteristic to Modulation Transfer Function (MTF) defined in the frequency domain, respective weight values are allocated according to the position of a transform coefficient. When using, for example, an 8×8 DCT block, the HVM 20 may be provided as shown in FIGS. 2(A) and 2(B).

In FIG. 2(B), the weight values in the HVM 20 are indicated by way of example only, and these values may be changed. Further, the coefficients indicated in FIG. 2(B) are values which represent the statistical properties of the DCT coefficients distribution. DC coefficients in respective DCT blocks represent a Gaussian distribution and are representative of the low frequency component of a block. AC coefficients in DCT blocks represent a Laplassian distribution and represent the high frequency component displaying edge direction. A further discussion concerning DCT coefficients can be found in the article entitled "Distribution of Two-Dimensional DCT Coefficients for Images", by R. C. Reininger and J. D. Gibson, *IEEE Trans. Com. Vol. COM*-31, pp. 835-839, June 1983, incorporated herein by reference.

Figure 3:
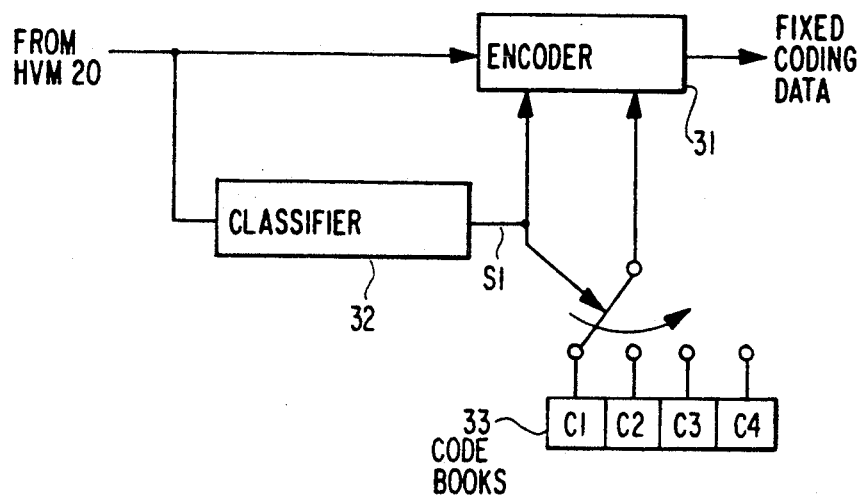
FIG. 3 schematically shows the classified vector quantizer of FIG. 1.

Vector-quantization block 30 is a classified vector quantizer (CVQ). As shown in FIG. 3, CVQ 30 comprises an encoder 31, a classifier 32 and a plurality of code books 33 (C1-C4). Encoder 31 scalar-quantizes the DC components of DCT coefficients, for example, by 8 bits, and receives classified information having, for example, 2 bits, from classifier 32. Encoder 31 also receives indices of, for example, six 9-bit representative vectors corresponding to the AC coefficients, from code books 33, to fixedly generate 64-bit encoding data for every block. The fixed compression encoding method employed by encoder 31 may be carried out by a microprocessor or the like. Further, the classifier 32 according to the invention may be the classifier disclosed in the article entitled "Discrete Cosine Transform Classified VQ (Vector Quantization) Technique for Image Coding", IEEE ICASSP Vol 3, 1989.

Figure 4:
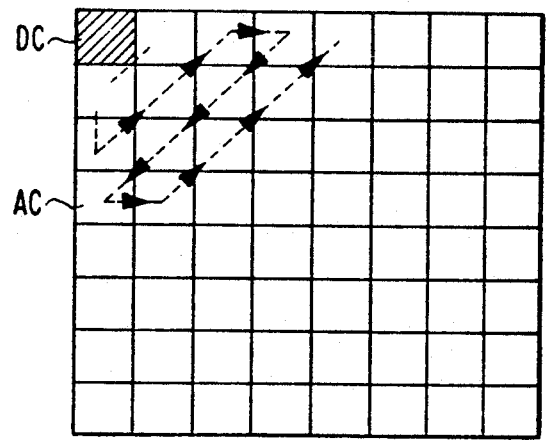
FIG. 4 illustrates DC and AC coefficients of an 8×8 DCT block.

As shown in FIG. 4, during zig-zag scanning of each DCT block, classifier 32 receives first and second AC coefficients (a) and (b), compares the size of the two AC coefficients, and decides on the edge direction of a DCT block according to their size and sign. The edge direction of the DCT block is classified as follows: if a>>b, $C_1$ (horizontal); if a<<b, $C_2$ (vertical); if a≈b and a·b>0, $C_3$ (+45° diagonal); and if a≈b and a·b<0, $C_4$ (−135° diagonal).

Accordingly, classifier 32 generates a control signal $S_1$ for classifying the DCT blocks into four classes ($C_1$-$C_4$) according to edge direction, and supplies 2-bit information corresponding to each class (for example. $C_1$=00, $C_2$=01, $C_3$=10, and $C_4$=11) to encoder 31.

Figure 5:
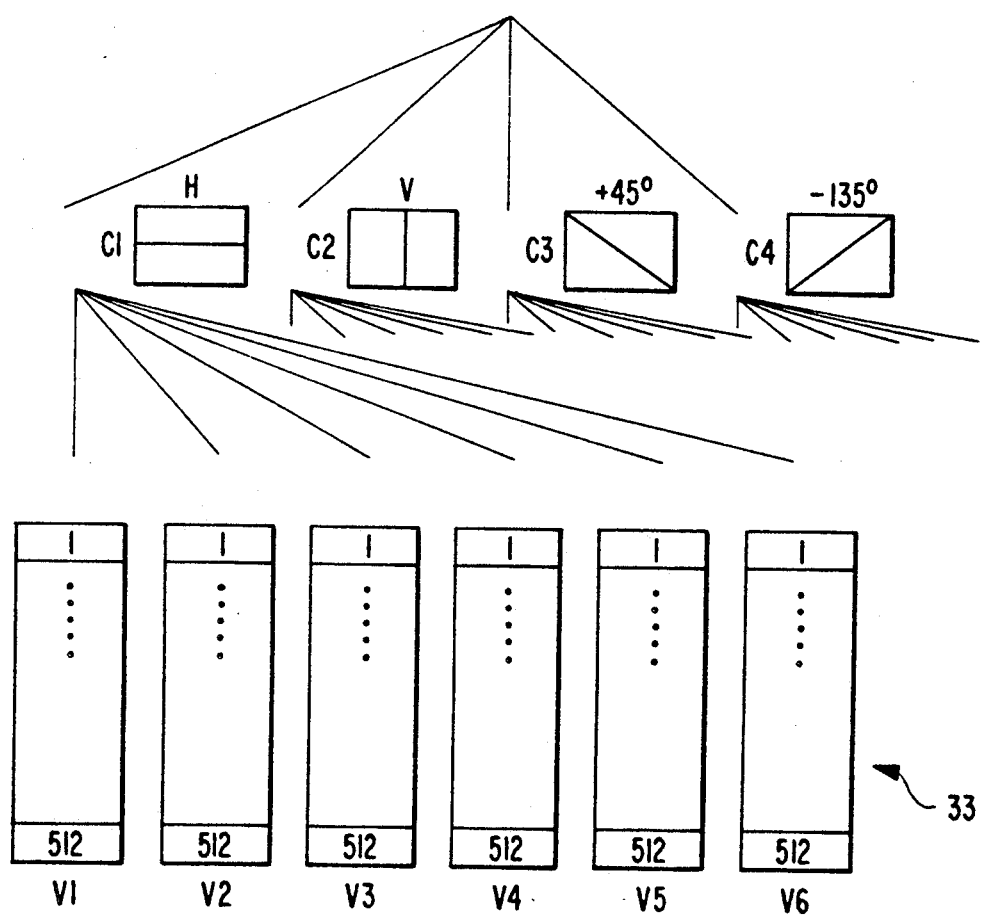
FIG. 5 illustrates one embodiment of the code book shown in FIG. 3.

Code books 33, as shown in FIG. 5, consist of six representative vector code books V1-V6 for each class. Each vector code book V1-V4 is 9×512 in size. That is, each vector codebook V1-V6 is composed of 512 codewords, and each codeword is data representing a shape. According to the invention, a code book for one class is selected among the four class code books ($C_1$-$C_4$) in response to control signal $S_1$ from classifier 32, and six 9-bit representative vector indices corresponding to AC coefficients are read out from six vector code books V1-V6 of the selected class and are supplied to encoder 31. According to the invention, a fixed bit rate compression encoding method is employed where the number of encoding bits is fixed. The fixed bits can be encoded by various well-known encoding methods as are well known in the art.

The classifications shown in FIG. 5 represent the relationship between the edge patterns in a DCT block. That is, according to first (a) and second (b) coefficients, the edge direction of the DCT block is classified into four directions: horizontal, vertical, and two diagonals. Further, the edge directions can be sub-divided.

The selection of the codeword is carried out by the following steps:

(a) compute the distortion according to the formula:

$$\sum_{i,j}^{N} \left| \frac{1}{HVM(i,j)} [DCT(i,j) - CODEBOOK(i,j)] \right|^2$$

between 512 codewords in a vector codebook and an input codeword;

(b) determine that distortion which has the lowest value; and (c) transfer an index corresponding to the determined distortion.

In the fixed bit rate compression encoding method of the present invention, a number B designating the number of encoding bits per block becomes constant according to the following expression:

$$B = l + \log_2 M + N \times P$$

The derivation for this expression will now be provided.

The number B designates the number of encoding bits per block and is given as a sum of several factors:

(a) In the DCT block, only the DC coefficient is processed for encoding (l bits).

(b) Each block is classified into M classes and r bits, according to the edge direction (M classes).

(c) AC coefficients of the classified DCT blocks are approximated to N representative vectors set for each class, and are vector-scalar-quantized by P-bit indices of each representative vector. That is, N×P bits are processed.

Therefore, $B$ = $(a) + (b) + (c)$
= $l$ bits + $r$ bits + $N \times P$ bits
= $l + \log_2 M + N \times P$ where M equals $2^r$ and r equals $\log_2 M$.

The present invention facilitates a high speed search and a special or trick playback for a digital VCR by a fixed compression bit rate. Further, the invention does not suffer from the problem of a partial loss of image information, thereby improving picture quality.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A fixed bit rate compression encoding method for dividing a two-dimensional video signal into discrete-cosine-transform (DCT) blocks an encoding the transform coefficients of each DCT block at a constant compression rate, the method comprising the steps of:

scalar-quantizing by l bits the DC coefficients of each of the DCT blocks;

classifying each of said DCT blocks into m classes according to edge direction;

approximating AC coefficients of said classified DCT blocks to n representative vectors set for each of said classes, said AC coefficients being vector-scalar-quantized by p-bit indices of each representative vector; and generating a number B designating the number of encoding bits per block at a fixed bit rate according to the expression $B = 1 + \log_2 m + n \times p$.

2. The fixed bit rate compression encoding method as defined in claim 1, wherein B is equal to 64, l is equal to 8, m is equal to 4, n is equal to 6, and p is equal to 9.

3. The fixed compression encoding method as defined in claim wherein said classifying step includes classifying the edge direction according to a size and a sign of first and second AC coefficients during a zig-zag scanning of each DCT block.

4. The fixed compression encoding method as defined in claim 3, wherein the number m of said classes is equal to four.

5. The fixed compression encoding method as defined in claim 4, wherein each class is determined according to a relationship between said first and second AC coefficients.

6. The fixed compression encoding method as defined in claim 5, wherein said first AC coefficient is represented by a, and said second AC coefficient is represented by b, and wherein if $a \gg b$, a first horizontal class $C_1$ is selected, if $a \ll b$, then a second vertical class $C_2$ is selected, if $a \approx b$ and $a \cdot b > 0$, then a third $+45°$ diagonal class $C_3$ is selected; and if $a \approx b$ and $a \cdot b < 0$, then a fourth $-135°$ diagonal class $C_4$ is selected.

* * * * *